United States Patent
Furuta (10) Patent No.: US 10,940,734 B2
(45) Date of Patent: Mar. 9, 2021

(54) SUSPENSION CONTROL SYSTEM AND VEHICLE

(71) Applicant: TOYOTA JIDOSHA KABUSHIKI KAISHA, Toyota (JP)

(72) Inventor: Hiroki Furuta, Toki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 299 days.

(21) Appl. No.: 16/033,406

(22) Filed: Jul. 12, 2018

(65) Prior Publication Data

US 2019/0030981 A1 Jan. 31, 2019

(30) Foreign Application Priority Data

Jul. 27, 2017 (JP) .............................. JP2017-145223

(51) Int. Cl.
| | | |
|---|---|---|
| *B60G 21/055* | (2006.01) | |
| *B60G 17/019* | (2006.01) | |
| *B60G 21/02* | (2006.01) | |
| *B60G 17/015* | (2006.01) | |

(52) U.S. Cl.
CPC ....... *B60G 21/0553* (2013.01); *B60G 17/019* (2013.01); *B60G 17/0152* (2013.01); *B60G 17/01908* (2013.01); *B60G 21/026* (2013.01); *B60G 2400/102* (2013.01); *B60G 2400/202* (2013.01); *B60G 2400/60* (2013.01)

(58) Field of Classification Search
CPC .............. B60G 21/0553; B60G 17/019; B60G 17/01908; B60G 21/026; B60G 17/0152; B60G 2400/202; B60G 2400/102; B60G 2400/60; B60G 17/015; B60G 21/055

USPC .......................................................... 701/37
See application file for complete search history.

(56) References Cited

U.S. PATENT DOCUMENTS

| | | | | |
|---|---|---|---|---|
| 2007/0150144 A1* | 6/2007 | Yasui | ................ | B60G 21/0555 701/38 |
| 2015/0012177 A1* | 1/2015 | Koch | ............... | B60G 17/01908 701/38 |

FOREIGN PATENT DOCUMENTS

| | | | |
|---|---|---|---|
| JP | 2016-002844 | * | 1/2016 |
| JP | 2016-002844 A | | 1/2016 |

* cited by examiner

*Primary Examiner* — Muhammad Shafi
(74) *Attorney, Agent, or Firm* — Sughrue Mion, PLLC (57) ABSTRACT

A suspension control system includes: a suspension that couples a sprung structure and an unsprung structure of a vehicle; a stabilizer; and a control unit configured to estimate a stroke speed, wherein the vehicle includes first wheels and second wheels, the suspension includes first suspensions provided for the first wheels and second suspensions provided for the second wheels, the stabilizer includes a first stabilizer bar that couples the first suspensions, the control unit includes: indirect stabilizer force calculation unit configured to calculate an indirect stabilizer force received by each of the second suspensions in conjunction with a posture change of the sprung structure; sum calculation unit configured to calculate a sum of forces acting on each of the second suspensions; and an observer configured to receive the sum and output an estimation value of a stroke speed of each of the second suspensions.

8 Claims, 6 Drawing Sheets

SUSPENSION CONTROL SYSTEM AND VEHICLE

INCORPORATION BY REFERENCE

The disclosure of Japanese Patent Application No. 2017-145223 filed on Jul. 27, 2017 including the specification, drawings and abstract is incorporated herein by reference in its entirety.

BACKGROUND

1. Technical Field

The disclosure relates to a suspension control system and a vehicle.

2. Description of Related Art

Skyhook damper control that uses a suspension capable of changing a damping force has been known. In the Skyhook damper control, in order to generate a requested damping force, it is required to estimate a relative speed between a sprung structure and an unsprung structure that are coupled via the suspension (hereinafter referred to as a "stroke speed"). A technique of estimating the stroke speed is disclosed in Japanese Patent Application Publication No. 2016-2844 (JP 2016-2844 A), for example. In this publication, a method of estimating the stroke speed by using a plant model and an observer is proposed, and the plant model and the observer are defined in accordance with a state space of an equation of motion that is based on a single-wheel, two-degree-of-freedom model.

SUMMARY

Posture of a vehicle such as an automobile is stabilized through provision of a stabilizer. The stabilizer aims at stabilizing the vehicle posture by a torsional reaction force of a stabilizer bar. Both end portions of the stabilizer bar are attached to right and left suspension arms, and an intermediate portion thereof is attached to a vehicle body. When the vehicle rolls and a difference in a displacement amount between right and left suspension arms is increased, the displacement difference between the right and left suspension arms is suppressed by the torsional reaction force of the stabilizer bar. In this way, the roll of the vehicle becomes insignificant, and the posture of the vehicle is stabilized.

However, when right and left wheels receive reverse phase input that is resulted from bumps on a road surface or the like, the stabilizer bar causes the roll of the vehicle due to the torsional reaction force of the stabilizer bar. This roll that is resulted from the torsional reaction force also has an influence on displacement amounts of suspensions for wheels unprovided with the stabilizer bar. More specifically, the roll that is resulted from the stabilizer provided on a vehicle front wheel side also has an influence on the displacement amounts of the suspensions on a vehicle rear wheel side. The roll that is resulted from the stabilizer provided on the vehicle rear wheel side also has an influence on the displacement amounts of the suspensions on the vehicle front wheel side. Therefore, estimation accuracy of a configuration that estimates the stroke speed of the suspension with no consideration of the influence of the roll resulted from the torsional reaction force of the stabilizer bar is possibly low.

The disclosure provides a suspension control system capable of improving estimation accuracy of a stroke speed in a vehicle provided with a stabilizer.

A first aspect of the disclosure is a suspension control system comprising: a suspension that couples a sprung structure and an unsprung structure of a vehicle; a stabilizer; and a control unit configured to estimate a stroke speed that is a relative speed between the sprung structure and the unsprung structure, wherein the vehicle includes first wheels and second wheels that are separately disposed from each other in a front-rear direction, the suspension includes first suspensions provided for the first wheels and second suspensions provided for the second wheels, the stabilizer includes a first stabilizer bar that couples the first suspensions disposed on a right side and a left side of the first stabilizer bar, the control unit includes: indirect stabilizer force calculation unit configured to calculate an indirect stabilizer force received by each of the second suspensions in conjunction with a posture change of the sprung structure by a torsional reaction force of the first stabilizer bar; sum calculation unit configured to calculate a sum of forces acting on each of the second suspensions on the basis of a damping force of the second suspension and the indirect stabilizer force; and an observer configured on the basis of a state space of an equation of motion based on a single-wheel model, and configured to receive the sum and output an estimation value of a stroke speed of each of the second suspensions.

In the above aspect, the sum calculation unit may be configured to calculate a force that is acquired by adding the damping force of each of the second suspensions and the indirect stabilizer force as the sum.

In the above aspect, the stabilizer may be configured by further including a second stabilizer bar that couples the right and left second suspensions. The control unit may be configured by further including direct stabilizer force calculation unit that calculates a direct stabilizer force received by each of the second suspensions in conjunction with a torsional reaction force of the second stabilizer bar. The sum calculation unit may be configured to calculate a force that is acquired by adding the damping force of each of the second suspensions, the indirect stabilizer force, and the direct stabilizer force as the sum.

In the above aspect, the suspension may be configured that the damping force variates in accordance with a drive current. The control unit may be configured by including damping force calculation unit that calculates the damping force of each of the second suspensions on the basis of the drive current received by the second suspension and the stroke speed of the second suspension.

A second aspect of the disclosure is a vehicle including: a sprung structure; an unsprung structure including first wheels and second wheels separately disposed from each other in a front-rear direction; first suspensions provided for the first wheels; second suspensions provided for the second wheels; a first stabilizer bar coupling the first suspensions disposed on the right side and the left side of the first stabilizer bar; and a control unit including circuitry configured to calculate an indirect stabilizer force received by each of the second suspensions in conjunction with a posture change of the sprung structure by a torsional reaction force of the first stabilizer bar, calculate a sum of forces acting on each of the second suspensions on the basis of a damping force of the second suspension and the indirect stabilizer force, and receive the sum and output an estimation value of a stroke speed of each of the second suspensions on the basis of a state space of an equation of motion based on a single-wheel model.

In the above aspect, the circuitry may be configured to calculate a force that is acquired by adding the damping force of each of the second suspensions and the indirect stabilizer force as the sum.

In the above aspect, the vehicle may further include a second stabilizer bar coupling the second suspensions disposed on the right side and the left side of the second stabilizer bar, wherein the circuitry may be configured to: calculate a direct stabilizer force received by each of the second suspensions in conjunction with a torsional reaction force of the second stabilizer bar; and calculate a force that is acquired by adding the damping force of each of the second suspensions, the indirect stabilizer force, and the direct stabilizer force as the sum.

In the above aspect, each of the second suspensions may be configured that the damping force variates in accordance with a drive current, and the circuitry may by configured to control the damping force of each of the second suspension on the basis of the drive current received by the second suspension and the stroke speed of the second suspension.

According to the suspension control system of the first aspect of the disclosure, when the sum of the forces acting on each of the second suspensions is calculated, the indirect stabilizer force, which is received by each of the second suspensions in conjunction with the posture change of the sprung structure by the torsional reaction force of the first stabilizer bar for coupling the right and left first suspensions, is taken into consideration. The observer receives the sum and outputs the estimation value of the stroke speed of each of the second suspensions. Thus, according to the first aspect of the disclosure, an influence of the posture change of the sprung structure by the first stabilizer bar can be reflected to the estimation value of the stroke speed.

In the configuration as the stabilizer that includes the first stabilizer bar coupling the right and left first suspensions, the sum of the forces acting on each of the second suspensions can be calculated by adding the damping force of the second suspension and the indirect stabilizer force.

In the configuration as the stabilizer that further includes the second stabilizer bar coupling the right and left second suspensions in addition to the above first stabilizer bar, the direct stabilizer force that is received by each of the second suspensions in conjunction with the torsional reaction force of the second stabilizer bar is further generated. According to the first aspect of the disclosure, in the case of such a configuration, the sum of the forces acting on each of the second suspensions can be calculated by adding the damping force of the second suspension, the indirect stabilizer force, and the direct stabilizer force.

In the case where each of the second suspensions is configured that the damping force variates in accordance with the drive current, the damping force of the second suspension can be calculated on the basis of the drive current received by the second suspension and the stroke speed of the second suspension.

As described above, the disclosure can provide the suspension control system capable of improving estimation accuracy of the stroke speed in the vehicle provided with the stabilizer.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of the disclosure will be described with reference to the drawings. Note that, when a numerical value such as number, a quantity, an amount, and a range of each element is mentioned in the following embodiment, the disclosure is not limited to the mentioned value unless otherwise clearly indicated or unless the element is clearly specified to the value in principle. A structure, steps, and the like, which will be described in the following embodiment, are not always essential to the disclosure unless otherwise clearly indicated or clearly specified in principle.

Figure 1:
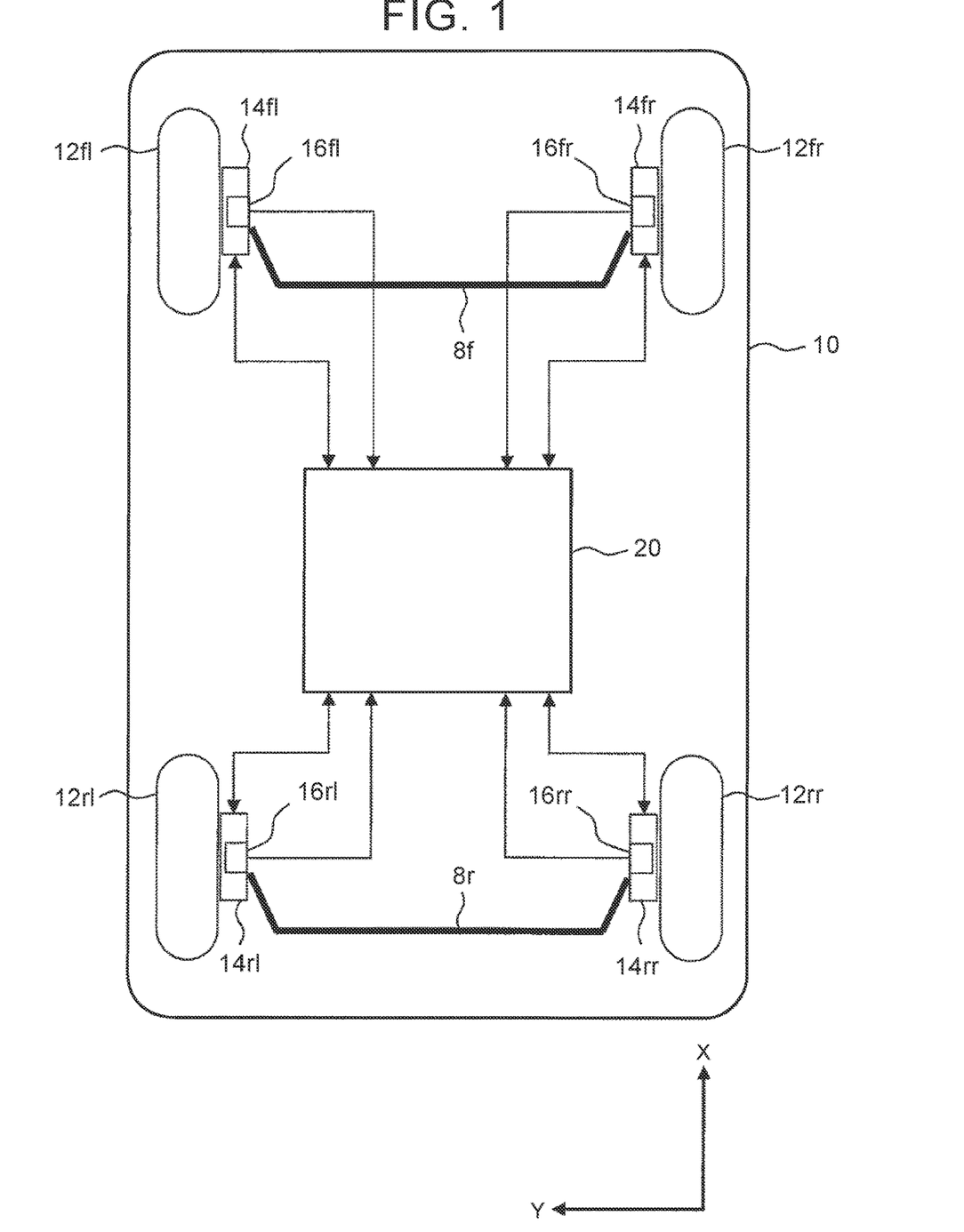
FIG. 1 is a view of a configuration of a vehicle on which a suspension control system according to a first embodiment is mounted.

First Embodiment <System Configuration of Vehicle in First Embodiment> Hereinafter, a first embodiment of the disclosure will be described with reference to the drawings. FIG. 1 is a view of a configuration of a vehicle on which a suspension control system according to the first embodiment is mounted. In the following description, an advancing direction (a front-rear direction) of a vehicle 10 is defined as an X-direction, a right-left direction of the vehicle 10 is defined as a Y-direction, and an up-down direction of the vehicle 10 is defined as a Z-direction. An up direction of the Z-direction is defined to have a "positive" sign.

The vehicle 10 according to the first embodiment has four wheels 12. As for the four wheels 12, front wheels and rear wheels are separately disposed in the X-direction, and each pair of a left wheel and a right wheel is separately disposed on the same axle that extends in the Y-direction. When the wheels 12 are distinguished in the following description, the front right wheel, the front left wheel, the rear right wheel, and the rear left wheel are described as wheels 12*fr*, 12*fl*, 12*rr*, and 12*rl*, respectively.

Each of the wheels 12 is provided with a variable suspension 14 and a sprung vertical acceleration sensor 16. When the variable suspensions 14 provided for the wheels 12*rl*, 12*fl*, 12*rr*, 12*rl* are distinguished in the following description, the variable suspensions 14 are described as variable suspensions 14*fr*, 14*fl*, 14*rr*, 14*rl*. Similarly, when the sprung vertical acceleration sensors 16 provided for the wheels 12*fr*, 12*fl*, 12*rr*, 12*rl* are distinguished in the following description, the sprung vertical acceleration sensors 16 are described as the sprung vertical acceleration sensors 16*fr*, 16*fl*, 16*rr*, 16*rl*.

The variable suspension 14 is configured by including: a compression/extension-dependent variable shock absorber capable of changing a magnitude of a damping force in accordance with a drive current; and a spring. The variable suspension 14 couples a sprung structure (a body and the like) and an unsprung structure (the wheel and the like) of the vehicle 10. Because the structure of the variable suspension 14 itself does not constitute the gist of the disclosure, the variable suspension 14 can adopt any structure as long as capable of controlling the damping force in accordance with a control amount Contents of the control may be any content as long as a posture change of the vehicle is suppressed.

The sprung vertical acceleration sensor 16 is disposed on the sprung structure of each of the wheels 12 in the vehicle 10 and detects acceleration in the up-down direction (the Z-direction) of the vehicle.

A stabilizer 8f that couples the right and left variable suspensions 14fr, 14fl is provided on the front wheel side of the vehicle 10. A stabilizer 8r that couples the right and left variable suspensions 14rr, 14rl is provided on the rear wheel side of the vehicle 10. Each of the stabilizers 8f, 8r is structured that both end portions of a stabilizer bar are attached to right and left suspension arms of the vehicle 10 and that an intermediate portion of the stabilizer bar is attached to the body of the vehicle 10.

The vehicle 10 according to the first embodiment includes an ECU 20 as a control unit for the variable suspensions 14. The ECU 20 estimates a stroke speed of each of the variable suspensions 14 on the basis of signals received from the sprung vertical acceleration sensor 16 and the variable suspensions 14. In the following description, the stroke speed is defined to have a "positive" sign on an extension side of the variable suspension 14 and a "negative" sign on a compression side thereof. Based on the estimated stroke speed, the ECU 20 controls a drive current value that is output to each of the variable suspensions 14 so as to stabilize the posture of the vehicle 10.

<Operation of First Embodiment>The ECU 20 is configured to be able to execute Skyhook damper control using the variable suspensions 14. In the Skyhook damper control, requested damping forces of the variable suspensions 14 for the wheels 12 are individually determined so as to stabilize the posture of a body section as the sprung structure of the vehicle 10. A damping force $F_{fc}$ of each of the variable suspensions 14 is changed by the stroke speed that is a relative speed between the sprung structure and the unsprung structure and the drive current value that is applied to the variable suspension 14. Thus, in order to make the damping force of each of the variable suspensions 14 approximate the requested damping force, it is requested to improve estimation accuracy of the stroke speed.

An observer (hereinafter referred to as a "single-wheel model observer") that is defined on the basis of a state space of an equation of motion based on a single-wheel model is used to estimate the stroke speed. Hereinafter, as an example of the single-wheel model observer, a method of estimating the stroke speed by using a single-wheel, one-degree-of-freedom model observer that performs feedback of sprung vertical acceleration will be described.

Figure 2:
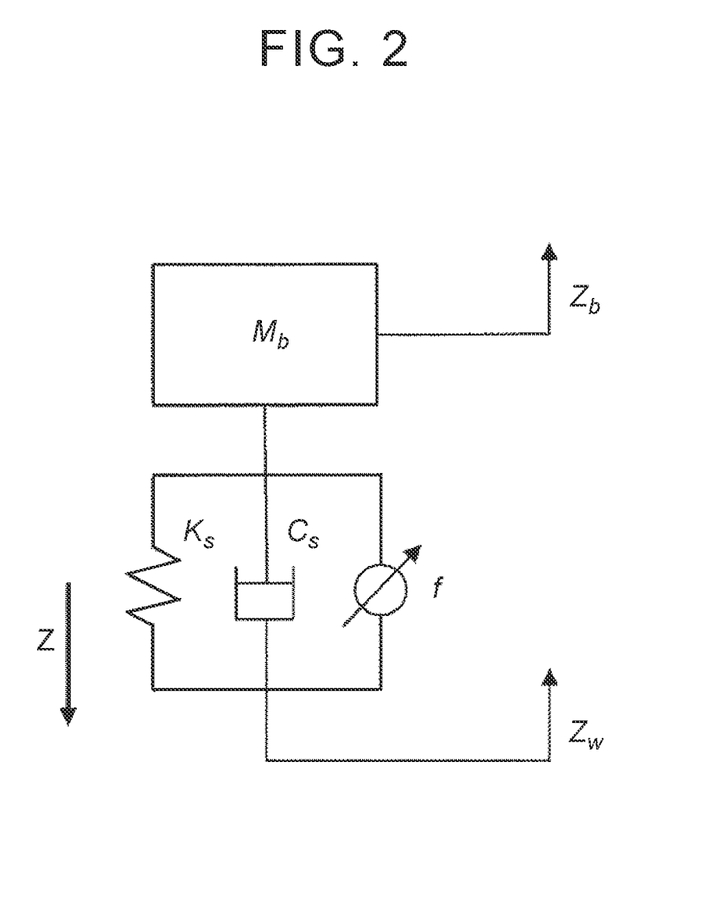
FIG. 2 is a diagram of a model configuration of a single-wheel, one-degree-of-freedom model observer.

FIG. 2 is a diagram of a model configuration of the single-wheel, one-degree-of-freedom model observer. In an example of the single-wheel model shown in this drawing, sprung mass, a spring constant of the suspension, a base damping coefficient of a shock absorber are set as $M_b$, $K_s$, and $C_s$, respectively. In addition, in the example of the single-wheel model shown in this drawing, a force in the Z-direction that acts on the variable suspension 14, sprung vertical displacement, and unsprung vertical displacement are set as f, $Z_b$, and $Z_w$, respectively.

In the cases where a state amount x is expressed by the following equation (1), an observation amount y is sprung vertical acceleration $Z_b''$, f is known input u, and $Z_w$ is unknown input w, a state equation and an observation equation of a single-wheel, one-degree-of-freedom model are expressed by the following equations (2), (3).

$$x = \begin{bmatrix} Z'_b - Z'_w \\ Z_b - Z_w \end{bmatrix} \quad (1)$$

$$x' = Ax + Bu + Gw \quad (2)$$

$$y = Cx + Du + Hw + v \quad (3)$$

Here, coefficient matrices A, B, C, D, G, H in the above equations (2), (3) are as described below.

$$A = \begin{bmatrix} -\frac{C_s}{M_b} & -\frac{K_s}{M_b} \\ 0 & 0 \end{bmatrix}$$

$$B = \begin{bmatrix} -\frac{1}{M_b} \\ 0 \end{bmatrix}$$

$$C = \begin{bmatrix} -\frac{C_s}{M_b} & -\frac{K_s}{M_b} \end{bmatrix}$$

$$D = \begin{bmatrix} -\frac{1}{M_b} \end{bmatrix}$$

$$G = \begin{bmatrix} -1 \\ 0 \end{bmatrix}$$

$$H = \begin{bmatrix} 0 \\ 0 \end{bmatrix}$$

Next, when estimation values of the state amount x and the observation amount y are set as $\hat{x}$ and $\hat{y}$, a state amount estimation equation and an observation amount estimation equation using a Kalman filter are expressed by the following equations (4), (5).

$$\hat{x}' = A\hat{x} + Bu + L(y - \hat{y}) \quad (4)$$

$$\hat{y} = C\hat{x} + Du \quad (5)$$

Here, L is an observer gain and is derived from the following equation (7) by using a positive definite solution P of a Riccati equation expressed by the following equation (6).

$$PA^T + AP - PC^T R^{-1} CP + Q = 0 \quad (6)$$

$$L = PC^T R^{-1} \quad (7)$$

Figure 3:
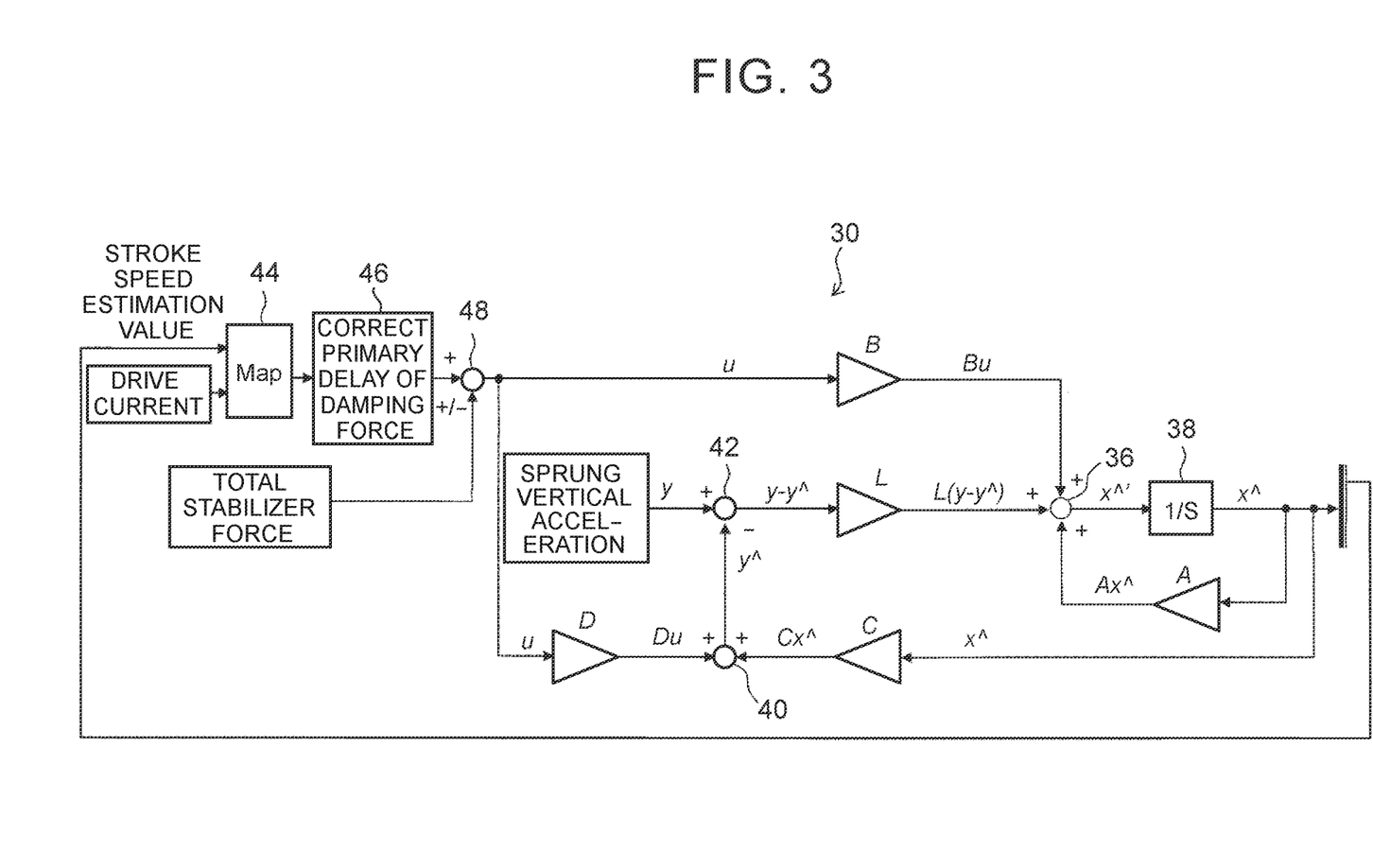
FIG. 3 is a control block diagram of a single-wheel model observer.

FIG. 3 is a control block diagram of the single-wheel model observer. Referring to FIG. 3, a detailed description will hereinafter be made on a configuration of the single-wheel model observer for calculating an estimation value of the stroke speed as the estimation value $\hat{x}$ of the state amount x. The force f as the known input u is input to a single-wheel model observer 30. Control logic for calculating the force f is a characteristic of the system in the first embodiment and thus will be described below.

The known input u, which is input to the single-wheel model observer 30, is multiplied by the coefficient matrix B and is then input to an adder 36. The adder 36 performs the calculation using the equation (4) and outputs a time differential value x^' of the estimation value x^ of the state amount x. The output from the adder 36 is input to an integrator 38. The estimation value x^ of the state amount x that is output from the integrator 38 is multiplied by a coefficient matrix A and is then input to the adder 36.

The estimation value x^ of the state amount x that is output from the integrator 38 is also multiplied by the coefficient matrix C and is then input to an adder 40. A product of the known input u and the coefficient matrix D is also input to the adder 40. The adder 40 performs the calculation using the equation (5) and outputs the estimation value y^ of the observation amount y.

The estimation value y^ of the observation amount y, which is output from the adder 40, is input to an adder 42. Sprung vertical acceleration $Z_b''$ as the observation amount y is also input to the adder 42. The adder 42 calculates an estimation error (y−y^) of the observation amount y by using these input values. The estimation error (y−y^) is multiplied by the observer gain L and is then input to the adder 36.

When the calculations are performed for each of the wheels 12 by using the above method, the state amount x that cannot directly be measured, that is, the stroke speed ($Z_b'-Z_w'$) of the variable suspension 14 for each of the wheels 12 can be estimated.

<Characteristics of First Embodiment> Next, characteristics of the first embodiment will be described. As described above, the vehicle 10 of the first embodiment includes the stabilizers 8f, 8r for the vehicle front and rear wheels. In each of the stabilizers 8, the torsional reaction force of the stabilizer bar acts in a direction to reduce a vertical displacement difference between the right and left wheels. In the following description, a force that is resulted from this torsional reaction force and is received by each of the variable suspensions 14 will be referred to as a "stabilizer force". The stabilizer force is expressed as a vector quantity in the Z-direction and is defined to have a "positive" sign in a down direction. For example, in the cases where the stroke amount of the variable suspension 14fl for the front left wheel 12fl is $Z_{sfl}$ and the stroke amount of the variable suspension 14fr for the front right wheel 12fr is $Z_{sfr}$, a stabilizer force $F_{ff}$ generated in the stabilizer 8f is expressed by the following equation (8). In the following equation (8), $K_{af}$ is the spring constant of the stabilizer 8f.

$$F_{ff}=K_{af}(Z_{sfr}-Z_{sfl}) \tag{8}$$

In the above equation (8), any stroke amount in the last sample or before that is estimated by using the single-wheel model observer can be used for the stroke amounts $Z_{sfl}, Z_{sfr}$ of the variable suspensions 14fl, 14fr. In addition, in a system that includes a vehicle height sensor, the stroke amounts may be calculated by using a detection value of the vehicle height sensor.

Similarly, in the cases where the stroke amount of the variable suspension 14rl for the rear left wheel 12rl is $Z_{srl}$ and the stroke amount of the variable suspension 14rr for the rear right wheel 12rr is $Z_{srr}$, a stabilizer force $F_{rr}$ generated in the stabilizer 8r is expressed by the following equation (9). In the following equation (9), $K_{ar}$ is the spring constant of the stabilizer 8r.

$$F_{rr}=K_{ar}(Z_{srr}-Z_{srl}) \tag{9}$$

The above stabilizer force $F_{ff}$ is received in opposite phases by the right and left wheels. More specifically, when the variable suspension 14fr receives a downward stabilizer force $+F_{ff}$, the variable suspension 14fl receives an upward stabilizer force $-F_{ff}$. Thus, the stabilizer force $F_{ff}$ acts as a force that causes the roll of the body as the sprung structure of the vehicle 10. In other words, the stabilizer force $F_{ff}$ also acts on the variable suspensions 14rr, 14rl on the rear wheel side in conjunction with the posture change of the body of the vehicle 10. When the sprung mass on the front wheel side and the sprung mass on the rear wheel side as respectively set as $M_f$ and $M_r$, a stabilizer force $F_{rf}$ that is received by the variable suspensions 14rr, 14rl due to the stabilizer force $F_{ff}$ is expressed by the following equation (10).

$$F_{rf} = \frac{M_r}{M_f} F_{ff} \tag{10}$$

Similarly, a stabilizer force $F_{fr}$ that is received by the variable suspensions 14fr, 14fl due to the stabilizer force $F_{rr}$ is expressed by the following equation (11).

$$F_{fr} = \frac{M_f}{M_r} F_{rr} \tag{11}$$

Just as described, not only the stabilizer force $F_{ff}$, which is directly received from the stabilizer 8f attached to the variable suspensions 14fr, 14fl themselves, but also the stabilizer force $F_{fr}$, which is indirectly received from the stabilizer 8r unattached to the variable suspensions 14fr, 14fl themselves via the body of the vehicle 10, act on the variable suspensions 14fr, 14fl on the front wheel side. Similarly, not only the stabilizer force $F_{rr}$, which is directly received from the stabilizer 8r attached to the variable suspensions 14rr, 14rl themselves, but also the stabilizer force $F_{rf}$, which is indirectly received from the stabilizer 8f unattached to the variable suspensions 14rr, 14rl themselves via the body of the vehicle 10, act on the variable suspensions 14rr, 14rl on the rear wheel side. In the following description, the stabilizer forces $F_{ff}$, $F_{rr}$, each of which is directly received, will also be referred to as "direct stabilizer forces", and the stabilizer forces $F_{fr}$, $F_{rf}$ each of which is indirectly received, will also be referred to as "indirect stabilizer forces".

As it has been described so far, a total stabilizer force $F_{fa}$ that acts on the variable suspensions 14fr, 14fl on the front wheel side and a total stabilizer force $F_{ra}$ that acts on the variable suspensions 14rr, 14rl on the rear wheel side are expressed by the following equations (12), (13). As described above, since the stabilizer forces are the vector quantities, each of the total stabilizer forces $F_{fa}$, $F_{ra}$ as a sum of these stabilizer forces is calculated as the vector quantity.

$$F_{fa}=F_{ff}+F_{fr} \tag{12}$$

$$F_{ra}=F_{rr}+F_{rf} \tag{13}$$

When the stroke speed is estimated by using the above-described single-wheel model observer, the force f in the Z-direction that acts on the variable suspension 14 is input as the known input u. The system of the first embodiment is characterized by a point that the above total stabilizer force is reflected to this force f. More specifically, the force f includes a damping force $F_{fc}$ of the variable suspension 14 and the total stabilizer force. When the damping forces $F_{fc}$ generated in the variable suspensions 14fl, 14fr, 14rl, 14rr are respectively set as $F_{fcfl}, F_{fcfr}, F_{fcrl}, F_{fcrr}$, forces $f_{fl}, f_{fr}, f_{rl}, f_{rr}$ that respectively act on the variable suspensions 14fl, 14fr, 14rl, 14rr are expressed by the following equations (14). In the following equation, a force that is a sum of the damping force and the total stabilizer force will also be referred to as a "sum". Since the total stabilizer forces $F_{fa}$, $F_{ra}$ and the damping forces $F_{fcfl}$, $F_{fcfr}$, $F_{fcrl}$, $F_{fcrr}$ are the vector quantities in the Z-direction, the sums $f_{fl}$, $f_{fr}$, $f_{rl}$, $f_{rr}$, which are the sums of these, are also calculated as the vector quantities in the Z-direction.

$$f_{fl} = F_{fcfl} - F_{fa}$$

$$f_{fr} = F_{fcfr} + F_{fa}$$

$$f_{rl} = F_{fcrl} - F_{ra}$$

$$f_{rr} = F_{fcrr} + F_{ra} \quad (14)$$

An adder 48 shown in FIG. 3 performs the calculations using the equations (14). More specifically, the adder 48 outputs the force f, which is the sum of the input damping force and the input total stabilizer force, as the known input u.

Figure 4:
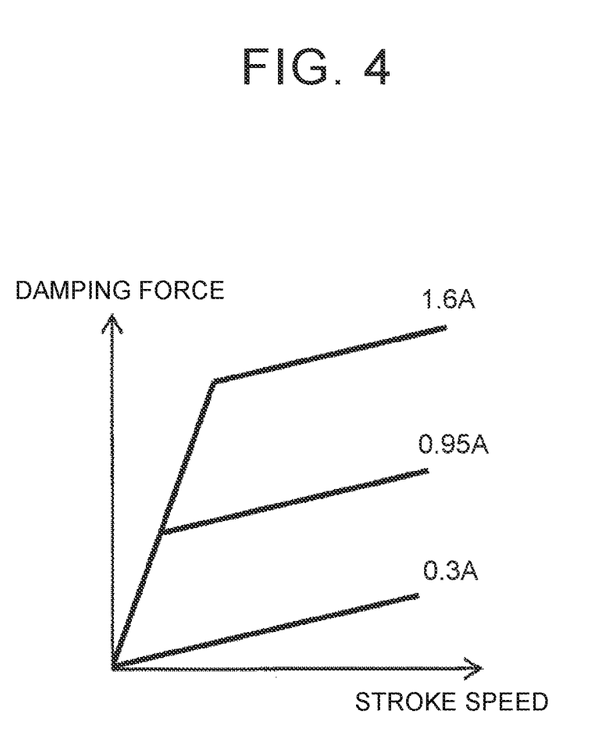
FIG. 4 is an exemplary map in which a relationship between a damping force and a stroke speed corresponds to a drive current value.

The damping force $F_{fc}$ variates in accordance with the drive current value that is supplied to the variable suspension 14 and the stroke speed. FIG. 4 is an exemplary map in which a relationship between the damping force $F_{fc}$ and the stroke speed corresponds to the drive current value. The ECU 20 stores the map shown in FIG. 4. The drive current value and the estimation value of the stroke speed as the estimation value x̂ of the state amount x are input to a calculation unit 44 shown in FIG. 3. In accordance with the map shown in FIG. 4, the calculation unit 44 calculates the damping force $F_{fc}$ that corresponds to the drive current value and the estimation value of the stroke speed. Here, the damping force $F_{fc}$ contains a delayed response element. Accordingly, after a calculation unit 46 corrects a primary delay of the damping force $F_{fc}$ that is output from the calculation unit 44, the damping force $F_{fc}$ is output to the adder 48.

As described above, not only the stabilizer force, which directly acts on the variable suspension 14, but also the indirect stabilizer force, which indirectly acts on the stabilizer provided in the other axle, are added to each of the sums $f_{fl}$, $f_{fr}$, $f_{rl}$, $f_{rr}$. In this way, the sum f as the force in the up-down direction (the Z-direction) that is received by the variable suspension 14 can accurately be calculated. Therefore, the estimation accuracy of the stroke speed can be improved.

Figure 5:
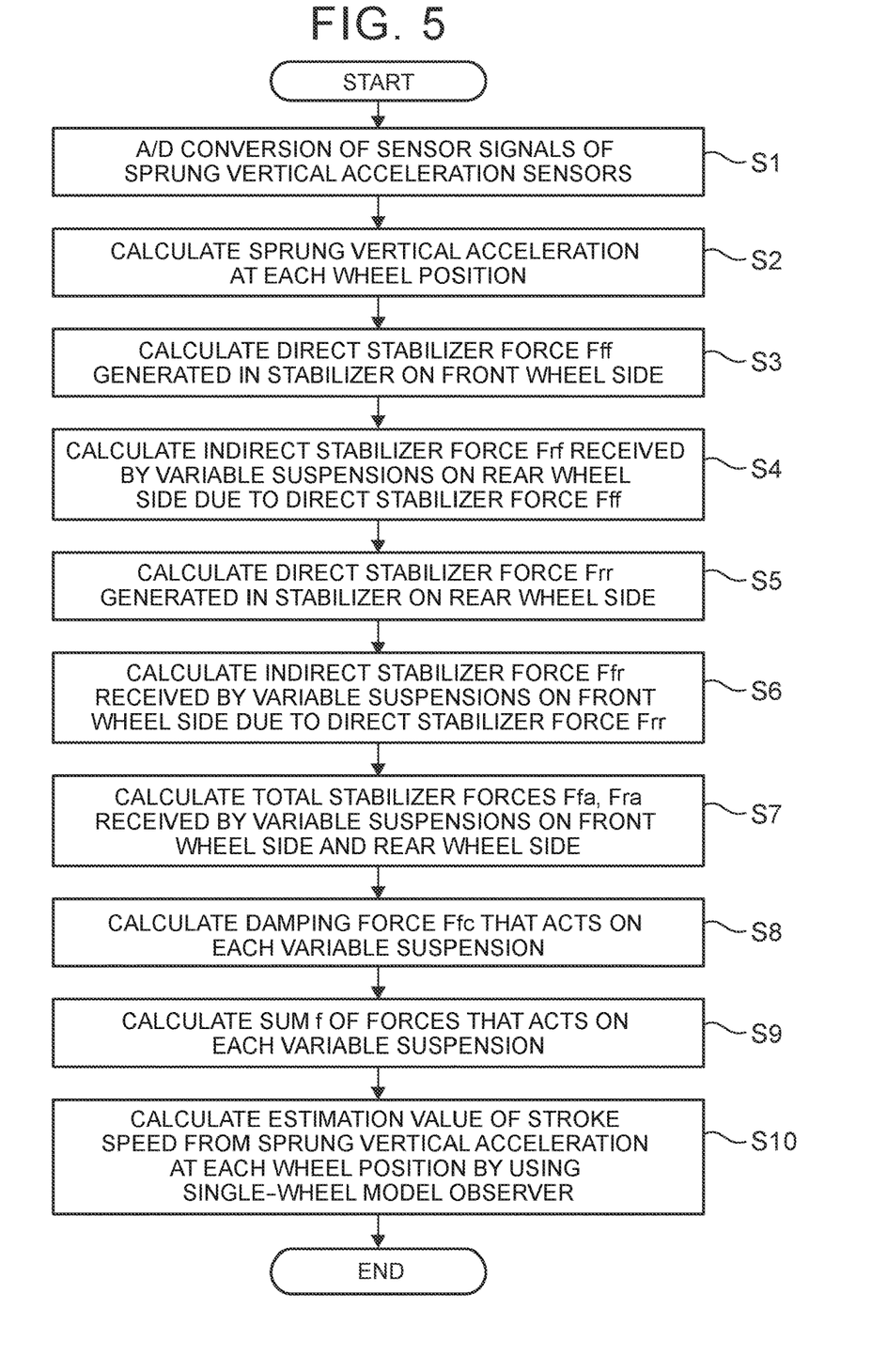
FIG. 5 is a flowchart of a routine that is executed when an ECU estimates a stroke speed of a variable suspension.

<Specific Processing in First Embodiment> Next, referring to a flowchart, a description will be made on specific processing that is executed when the system in the first embodiment estimates the stroke speed. FIG. 5 is a flowchart of a routine that is executed when the ECU 20 estimates the stroke speed of each of the variable suspensions 14.

In this routine, the sensor signals of the sprung vertical acceleration sensors 16 are subjected to A/D conversion (step S1). In the following description, values of the sensor signals of the sprung vertical acceleration sensors 16fr, 16fl, 16rr, 16rl after the A/D conversion will respectively be referred to as detected acceleration $Z_1''$, $Z_2''$, $Z_3''$, $Z_4''$.

Next, the sprung vertical acceleration at each wheel position is calculated (step S2). Here, in accordance with the following equations (15) to (18) using the detected acceleration $Z_1''$, $Z_2''$, $Z_3''$, $Z_4''$, vertcal acceleration $Z_g''$, roll acceleration $\Phi_g''$, and pitch acceleration $\Theta_g''$ at a gravity center position of the sprung structure are calculated first. In the following equations (15) to (18), $L_1$, $L_2$, $L_3$, $L_4$ and $W_1$, $W_2$, $W_3$, $W_4$ represent positions in the X-direction and positions in the Y-directions of the sprung vertical acceleration sensors 16fr, 16fl, 16rr, 16rl. In addition, $L_g$ and $W_g$ respectively represent the gravity center position in the X-direction and the gravity center position in the Y-direction of the sprung structure. These values $L_i$, $W_i$ (i=1, 2, 3, 4), $L_g$, $W_g$ are fixed values that are determined by sensor arrangement and the like, and values that are stored in memory of the ECU 20 in advance are used therefor.

$$M = \begin{bmatrix} L_1 W_1 & L_1 & W_1 & 1 \\ L_2 W_2 & L_2 & W_2 & 1 \\ L_3 W_3 & L_3 & W_3 & 1 \\ L_4 W_4 & L_4 & W_4 & 1 \end{bmatrix}^{-1} \quad (15)$$

$$Z_g'' = \sum_{i=1}^{4} \{M(2, i)L_g + M(4, i)\}Z_i'' \quad (16)$$

$$\Phi_g'' = -\sum_{i=1}^{4} \{M(1, i)L_g + M(3, i)\}Z_i'' \quad (17)$$

$$\Theta_g'' = \sum_{i=1}^{4} M(2, i)Z_i'' \quad (18)$$

In step S2, the sprung vertical acceleration $Z_b''$ at each of the wheel positions is calculated next. Here, in accordance with the following equation (19), sprung vertical acceleration $Z_{bfl}''$, $Z_{bfr}''$, $Z_{brl}''$, $Z_{brr}''$ immediately above the variable suspensions 14fl, 14fr, 14rl, 14rr are calculated. In the equation (19), $T_f$ is tread width of the front wheel, $T_r$ is tread width of the rear wheel, $l_f$ is a distance between a front wheel axis and sprung gravity center, and $l_r$ is a distance between a rear wheel axis and the sprung gravity center. These values $T_f$, $T_r$, $l_f$, $l_r$ are fixed values that are defined in accordance with a configuration of the vehicle 10, and values that are stored in the memory of the ECU 20 in advance are used therefor.

$$\begin{bmatrix} Z_{bfr}'' \\ Z_{bfl}'' \\ Z_{brr}'' \\ Z_{brl}'' \end{bmatrix} = \begin{bmatrix} 1 & -\frac{T_f}{2} & -l_f \\ 1 & \frac{T_f}{2} & -l_f \\ 1 & -\frac{T_r}{2} & l_r \\ 1 & \frac{T_r}{2} & l_r \end{bmatrix} \begin{bmatrix} Z_g'' \\ \Phi_g'' \\ \Theta_g'' \end{bmatrix} \quad (19)$$

Note that the method of calculating the sprung vertical acceleration $Z_{bfl}''$, $Z_{bfr}''$, $Z_{brl}''$, $Z_{brr}''$ is not limited to the above method. For example, a known method of using the three sprung vertical acceleration sensors 16 may be adopted.

In the next step, the direct stabilizer force $F_{ff}$ that is generated in the stabilizer 8f is calculated in accordance with the equation (8) (step S3). Next, in accordance with the equation (10), the indirect stabilizer force $F_{rf}$, which is received by the variable suspensions 14rr, 14rl due to the direct stabilizer force $F_{ff}$, is calculated (step S4).

In the next step, the direct stabilizer force $F_{rr}$ that is generated in the stabilizer 8r is calculated in accordance with the equation (9) (step S5). Next, in accordance with the equation (11), the indirect stabilizer force $F_{fr}$, which is received by the variable suspensions 14fr, 14fl due to the direct stabilizer force $F_{rr}$, is calculated (step S6). Then, in accordance with the equations (12), (13), the total stabilizer force $F_{fa}$, which acts on the variable suspensions 14fr, 14fl on the front wheel side, and the total stabilizer force $F_{ra}$, which acts on the variable suspensions 14*rr*, 14*rl* on the rear wheel side, are calculated (step S7).

In the next step, the drive current and the estimation value of the stroke speed are read for each of the variable suspensions 14, and the damping forces $F_{fcfl}$, $F_{fcfr}$, $F_{fcrl}$, $F_{fcrr}$, each of which corresponds thereto, are identified from the map shown in FIG. 4 (step S8).

In the next step, the total stabilizer forces $F_{fa}$, $F_{ra}$ calculated in above step S7 and the damping forces $F_{fcfl}$, $F_{fcfr}$, $F_{fcrl}$, $F_{fcrr}$ calculated in above step S8 are assigned to the above equation (14). In this way, the sums $f_{fl}$, $f_{fr}$, $f_{rl}$, $f_{rr}$, which respectively act on the variable suspensions 14*fl*, 14*fr*, 14*rl*, 14*rr*, are calculated (step S9).

Next, each of the forces $f_{fl}$, $f_{fr}$, $f_{rl}$, $f_{rr}$ calculated in above step S9 is set as the known input u, each of the sprung vertical acceleration $Z_{bfl}''$, $Z_{bfr}''$, $Z_{brl}''$, $Z_{brr}''$ calculated in above step S2 is set as the observation amount y, and the above-described single-wheel model observer is used. In this way, the stroke speed ($Z_b'-Z_w'$) as the state amount x is estimated (step S10).

As it has been described so far, according to the suspension control system of the first embodiment, an influence of the stabilizer force that is generated in the stabilizer 8*f* provided on the front wheel side is reflected to the forces $f_{rl}$, $f_{rr}$ that respectively act on the variable suspensions 14*rl*, 14*rr* on the rear wheel side unprovided with the stabilizer 8*f*. Similarly, an influence of the stabilizer force that is generated in the stabilizer 8*r* provided on the rear wheel side is reflected to the forces $f_{fl}$, $f_{fr}$ that respectively act on the variable suspensions 14*fl*, 14*fr* on the front wheel side unprovided with the stabilizer 8*r*. In this way, the force (the known input) that is received by each of the variable suspensions 14 can accurately be calculated. Therefore, the stroke speed can accurately be estimated by using the single-wheel model observer.

A mode that is modified as will be described below may be applied to the suspension control system in the first embodiment.

A stabilizer 8 provided in the vehicle 10 may be configured by only including the stabilizer 8*f* on the front wheel side and not including the stabilizer 8*r* on the rear wheel side. In this case, the calculation may be performed using the equations (12), (13) with the stabilizer forces $F_{fr}$, $F_{rr}$ being 0. In such a configuration, $F_{ra}=F_{rf}$. Thus, when the stroke speeds of the variable suspensions 14*rl*, 14*rr* on the rear wheel side are estimated, the indirect stabilizer force can be reflected to the calculations. Similarly, the stabilizer 8 provided in the vehicle 10 may be configured by only including the stabilizer 8*r* on the rear wheel side and not including the stabilizer 8*f* on the front wheel side. In such a configuration, $F_{fa}=F_{fr}$. Thus, when the stroke speeds of the variable suspensions 14*fl*, 14*fr* on the front wheel side are estimated, the indirect stabilizer force can be reflected to the calculations.

As long as the observer is the single-wheel model observer, the number of degrees of freedom, a method of deriving the state equation, a continuous system, a discrete system, and the like of the observer are not limited. For example, the system may be configured to estimate the stroke speed by using a single-wheel, two-degree-of-freedom model observer. In addition, the single-wheel model observer is not limited to the configuration of using the Kalman filter of the continuous system but may be configured to use the Kalman filter of the discrete system.

Figure 6:
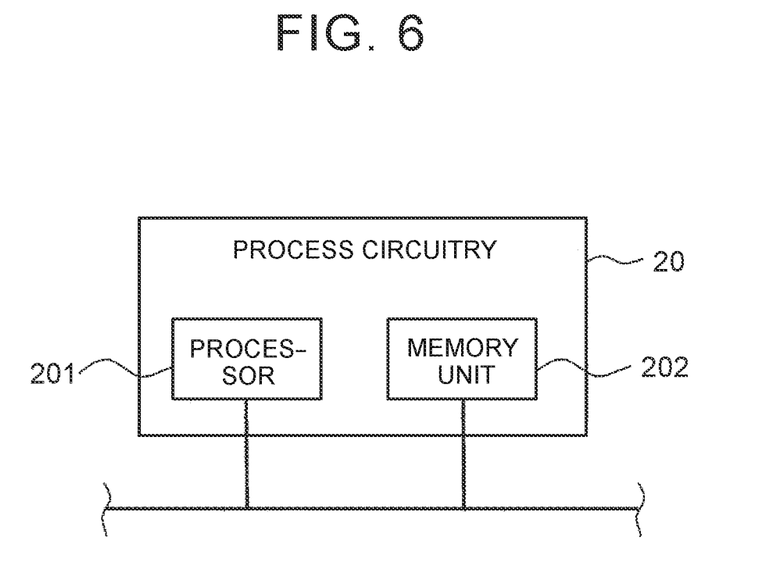
FIG. 6 is a diagram of an exemplary hardware configuration of the ECU that is provided in the suspension control system of the first embodiment.

The ECU 20 provided in the suspension control system of the first embodiment may be configured as follows. FIG. 6 is a diagram of an exemplary hardware configuration of the ECU 20 that is provided in the suspension control system of the first embodiment. Each function of the ECU 20 is realized by processing circuitry. In the example shown in FIG. 6, the processing circuitry of the ECU 20 includes at least one processor 201 and at least one memory unit 202.

In the case where the processing circuitry includes the at least one processor 201 and the at least one memory unit 202, each of the functions of the ECU 20 is realized by software, firmware, or a combination of the software and the firmware. At least one of the software and the firmware is written as a program. At least one of the software and the firmware is stored in the at least one memory unit 202. The at least one processor 201 realizes each of the functions of the ECU 20 when reading the program stored in the at least one memory unit 202 and executing the program. The at least one processor 201 is also referred to as a central processing unit (CPU), a central processor, a processor, an arithmetic unit, a microprocessor, a microcomputer, and a digital signal processor (DSP). For example, the at least one memory unit 202 is any of volatile or nonvolatile semiconductor memory, a magnetic disc, a flexible disc, and an optical disc such as random access memory (RAM), read only memory (ROM), flash memory, erasable programmable read only memory (EPROM), electrically erasable programmable read-only memory (EEPROM).

Figure 7:
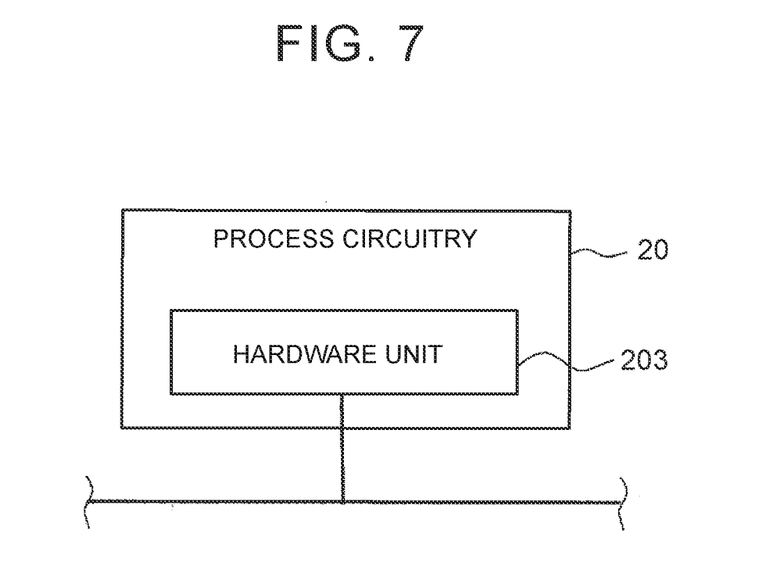
FIG. 7 is a diagram of another exemplary hardware configuration of the ECU that is provided in the suspension control system of the first embodiment.

FIG. 7 is a diagram of another exemplary hardware configuration of the ECU 20 that is provided in the suspension control system of the first embodiment. In the example shown in FIG. 7, the processing circuitry of the ECU 20 includes at least one dedicated hardware unit 203.

In the case where the processing circuitry includes the at least one dedicated hardware unit 203, the processing circuitry is a single circuit, composite circuitry, a programmed processor, a parallel-programmed processor, an application specific integrated circuit (ASIC), a field-programmable gate array (FPGA), or any combination of these. The function of each section in the ECU 20 may separately be realized by the processing circuitry. Alternatively, the functions of the sections in the ECU 20 may collectively be realized by the processing circuitry.

Some of the functions of the ECU 20 may be realized by the dedicated hardware unit 203 while the rest of the functions may be realized by the software or the firmware. Just as described, the processing circuitry realizes each of the functions of the ECU 20 by the hardware unit 203, the software, the firmware, or the combination of these.

In the suspension control system of the first embodiment, the wheels 12 correspond to the first wheel and the second wheel in the first disclosure. More specifically, in the case where the wheels 12*fr*, 12*fl* as the front wheels each correspond to the first wheel, the wheels 12*rr*, 12*rl* as the rear wheels each correspond to the second wheel. On the contrary, in the case where the wheels 12*rr*, 12*rl* as the rear wheels each correspond to the first wheel, the wheels 12*fr*, 12*fl* as the front wheels each correspond to the second wheel.

In the suspension control system of the first embodiment, the variable suspensions 14 correspond to the first suspension and the second suspension in the first disclosure. More specifically, in the case where the wheels 12*fr*, 12*fl* each correspond to the first wheel, the variable suspensions 14*fr*, 14*fl* on the front wheel side each correspond to the first suspension, and the variable suspensions 14*rr*, 14*rl* on the rear wheel side each correspond to the second suspension. On the contrary, in the case where the wheels 12*rr*, 12*rl* each correspond to the first wheel, the variable suspensions 14*fr*, 14*fl* on the front wheel side each correspond to the second suspension, and the variable suspensions 14*rr*, 14*rl* on the rear wheel side each correspond to the first suspension.

In the suspension control system of the first embodiment, the stabilizer bars of the stabilizers 8 correspond to the first stabilizer bar in the first disclosure and the second stabilizer bar in the third disclosure. More specifically, in the case where the wheels 12*fr,* 12*fl* each correspond to the first wheel, the stabilizer bar of the stabilizer 8*f* corresponds to the first stabilizer bar, and the stabilizer bar of the stabilizer 8*r* corresponds to the second stabilizer bar. On the contrary, in the case where the wheels 12*rr,* 12*rl* each correspond to the first wheel, the stabilizer bar of the stabilizer 8*r* corresponds to the first stabilizer bar, and the stabilizer bar of the stabilizer 8*f* corresponds to the second stabilizer bar.

In the suspension control system of the first embodiment, "indirect stabilizer force calculation unit" is realized when the ECU 20 executes the processing in step S4 or step S6, and "sum calculation unit" is realized when the ECU 20 executes the processing in step S9.

In the suspension control system of the first embodiment, "direct stabilizer force calculation unit" is realized when the ECU 20 executes the processing in step S3 or step S5, and "damping force calculation unit" is realized when the ECU 20 executes the processing in step S8.

What is claimed is:

1. A suspension control system comprising:
    a suspension that couples a sprung structure and an unsprung structure of a vehicle;
    a stabilizer; and
    a control unit configured to estimate a stroke speed that is a relative speed between the sprung structure and the unsprung structure, wherein
    the vehicle includes first wheels and second wheels that are separately disposed from each other in a front-rear direction,
    the suspension includes first suspensions provided for the first wheels and second suspensions provided for the second wheels,
    the stabilizer includes a first stabilizer bar that couples the first suspensions disposed on a right side and a left side of the first stabilizer bar,
    the control unit is configured to:
        calculate a first force received by each of the second suspensions in conjunction with a posture change of the sprung structure by a torsional reaction force of the first stabilizer bar;
        calculate a sum of forces acting on each of the second suspensions on the basis of a damping force of the second suspension and the first force calculated by the control unit; and
        receive the sum and output an estimation value of a stroke speed of each of the second suspensions on the basis of a state space of an equation of motion based on a single-wheel model.

2. The suspension control system according to claim 1, wherein
    the control unit is further configured to calculate a force that is acquired by adding the damping force of each of the second suspensions and the first calculated force as the sum.

3. The suspension control system according to claim 1, wherein
    the stabilizer further includes a second stabilizer bar that couples the second suspensions disposed on a right side and a left side of the second stabilizer bar, and
    the control unit is further configured to:
        calculate a direct stabilizer force received by each of the second suspensions in conjunction with a torsional reaction force of the second stabilizer bar, and
        calculate a force that is acquired by adding the damping force of each of the second suspensions, the first force, and the direct stabilizer force as the sum.

4. The suspension control system according to claim 1, wherein
    the suspension is configured to vary the damping force in accordance with a drive current, and
    the control unit is further configured to calculate the damping force of each of the second suspensions on the basis of the drive current received by the second suspension and the stroke speed of the second suspension.

5. A vehicle comprising:
    a sprung structure;
    an unsprung structure including
        first wheels and second wheels separately disposed from each other in a front-rear direction;
    first suspensions provided for the first wheels;
    second suspensions provided for the second wheels;
    a first stabilizer bar coupling the first suspensions disposed on the right side and the left side of the first stabilizer bar; and
    a control unit including circuitry configured to
        calculate an indirect stabilizer force received by each of the second suspensions in conjunction with a posture change of the sprung structure by a torsional reaction force of the first stabilizer bar,
        calculate a sum of forces acting on each of the second suspensions on the basis of a damping force of the second suspension and the indirect stabilizer force, and
        receive the sum and output an estimation value of a stroke speed of each of the second suspensions on the basis of a state space of an equation of motion based on a single-wheel model.

6. The vehicle according to claim 5, wherein
    the circuitry is configured to calculate a force that is acquired by adding the damping force of each of the second suspensions and the indirect stabilizer force as the sum.

7. The vehicle according to claim 5 further comprising:
    a second stabilizer bar coupling the second suspensions disposed on the right side and the left side of the second stabilizer bar, wherein
    the circuitry is configured to:
        calculate a direct stabilizer force received by each of the second suspensions in conjunction with a torsional reaction force of the second stabilizer bar; and
        calculate a force that is acquired by adding the damping force of each of the second suspensions, the indirect stabilizer force, and the direct stabilizer force as the sum.

8. The vehicle according to claim 5, wherein
    each of the second suspensions is configured that the damping force variates in accordance with a drive current, and
    the circuitry is configured to control the damping force of each of the second suspension on the basis of the drive current received by the second suspension and the stroke speed of the second suspension.

* * * * *